Figure 1:
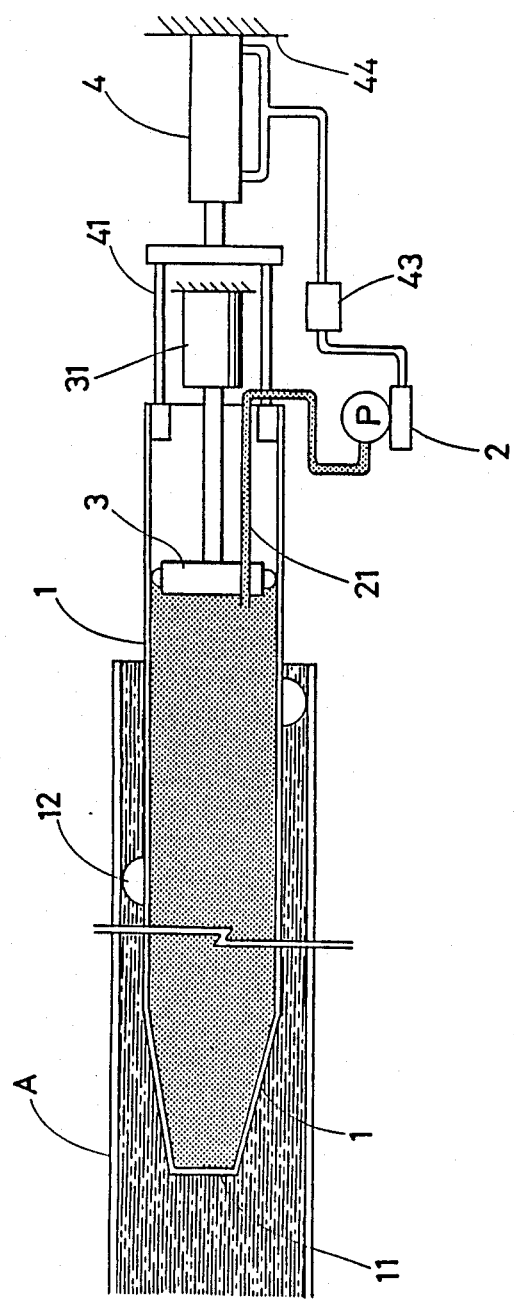

United States Patent [19]

Ueda

[11] Patent Number: 4,830,538

[45] Date of Patent: May 16, 1989

[54] METHOD AND APPARATUS FOR REFURBISHING DEFICIENT PIPES

[75] Inventor: Kouhei Ueda, Kanagawa, Japan

[73] Assignee: Taisei Corporation, Tokyo, Japan

[21] Appl. No.: 169,253

[22] Filed: Mar. 16, 1988

[30] Foreign Application Priority Data

Mar. 24, 1987 [JP] Japan .................................. 62-70019

[51] Int. Cl.$^4$ ............................................. F16L 1/00
[52] U.S. Cl. ........................................ 405/184; 138/97; 254/134.4; 254/29 R; 405/154; 405/146
[58] Field of Search ............... 405/154, 184, 146, 150, 405/156; 254/29 R, 134.4; 138/97

[56] References Cited

U.S. PATENT DOCUMENTS

| 2,325,565 | 7/1943 | Williams | 405/184 |
|---|---|---|---|
| 2,756,020 | 7/1956 | D'Audiffret et al. | 405/184 X |
| 2,794,758 | 6/1957 | Harper et al. | 405/154 X |
| 4,456,401 | 6/1984 | Williams | 405/150 |
| 4,626,134 | 12/1986 | Coumont | 405/184 |
| 4,723,873 | 2/1988 | Masznyik | 138/97 X |
| 4,724,108 | 2/1988 | Jurgenlohmann et al. | 138/97 X |

FOREIGN PATENT DOCUMENTS

0108590  5/1984  European Pat. Off. ............ 405/154

OTHER PUBLICATIONS

Pipeline Refurbishing Method, Taisei Corporation.

Primary Examiner—Dennis L. Taylor
Attorney, Agent, or Firm—Sughrue, Mion, Zinn, Macpeak & Seas

[57] ABSTRACT

A refurbishing method for an existing pipeline under the sea or on the ground by inserting a rigid inner pipe having its front end temporarily blocked includes (a) driving the rigid pipe by increasing the volume of the fluid filled and sealed in the new pipe, (b) driving the new pipe by an axial force with the aid of a holder at the rear rim of the new pipe, and (c) regulating the movement of the new pipe. An apparatus to carry out the above-mentioned method is also provided. After inserting one pipe, all defines of the apparatus are detached, then another new pipe is connected, and repeated insertions end up as complete pipeline.

8 Claims, 3 Drawing Sheets

METHOD AND APPARATUS FOR REFURBISHING DEFICIENT PIPES

This invention relates to a method and an apparatus for refurbishing deteriorated pipes, such as pipelines under the sea or on the ground, sewer pipes, water supplying pipes, inlet channels and diversion channels.

Corrosion and cracks of old pipelines occur with the passage of time and tend to cause problems such as leakage of the content out of the pipes or incursion of underground water or seawater into the pipes. To cope with these problems, a construction of a new pipeline laying parallel to the existing deteriorated pipeline is conventionally carried out.

In such a method, high cost and long working period for construction are always required. Moreover, it is getting difficult to acquire a route to construct a renewed pipeline beside the old one. As a result, many old deteriorated pipelines have been left undone. Removal or recovery of the old pipes also causes problems in respects to high cost and time consuming.

Under these circumstances, a technique has been developed, in which a new pipe is to be inserted inside of an existing old pipe in situ for renewal. However, this method itself has several problems as follows:

(a) In a method in which a new pipe is introduced by pulling through the inside of an existing old pipe from one end of the old pipe to the other with an aid of a wire rope attached to the head of the new pipe, it is quite difficult to let the rope tunnel through the existing old pipe prior to the pulling operation. Moreover, the wire rope touches the internal wall of the deteriorated pipe and damages the wall during the pulling operation.

(b) In a method in which a new pipe is compressed at the end thereof into an existing old pipe, excessive compressive force acts on the longitudinal axis of the newly constructing pipe and causes buckling. This is especially true, when the newly constructing pipe is relatively long. Consequently, the practical use of this method is fairly limited.

The object of this invention is to provide a method and an apparatus to solve the abovementioned problems in the following manners (a) Refurbishing a pipeline without removing an existing pipe.

(b) Refurbishing a pipeline of long distance avoiding excessive stress on the pipe.

(c) Refurbishing a pipeline without damaging the surface of internal wall of an existing pipe.

A method to solve the above mentioned problems according to the present invention is to drive a new pipe into the inside of an existing pipe by (1) increasing the volume of fluid to be filled in the interior of the new pipe; (2) compressing the fluid filled and sealed in the interior of the new pipe, and further (3) giving compressive force directly to the new pipe from the end thereof. In short, this is a method in which a new pipe can be inserted into an existing pipe under the conditions wherein the new pipe is swollen by an increased volume of a fluid filled and sealed in the pipe, and thus a tensile force is generated on the pipe member.

Further, the present invention provides an apparatus to drive the new pipe into the existing pipe, the apparatus comprising a device to increase the volume of the fluid to be filled in the new pipe, a device to compress the fluid, a device to give a compressive force at the end of the inserting pipe and a device to control an abrupt thrusting movement of the new pipe.

Figure 2:
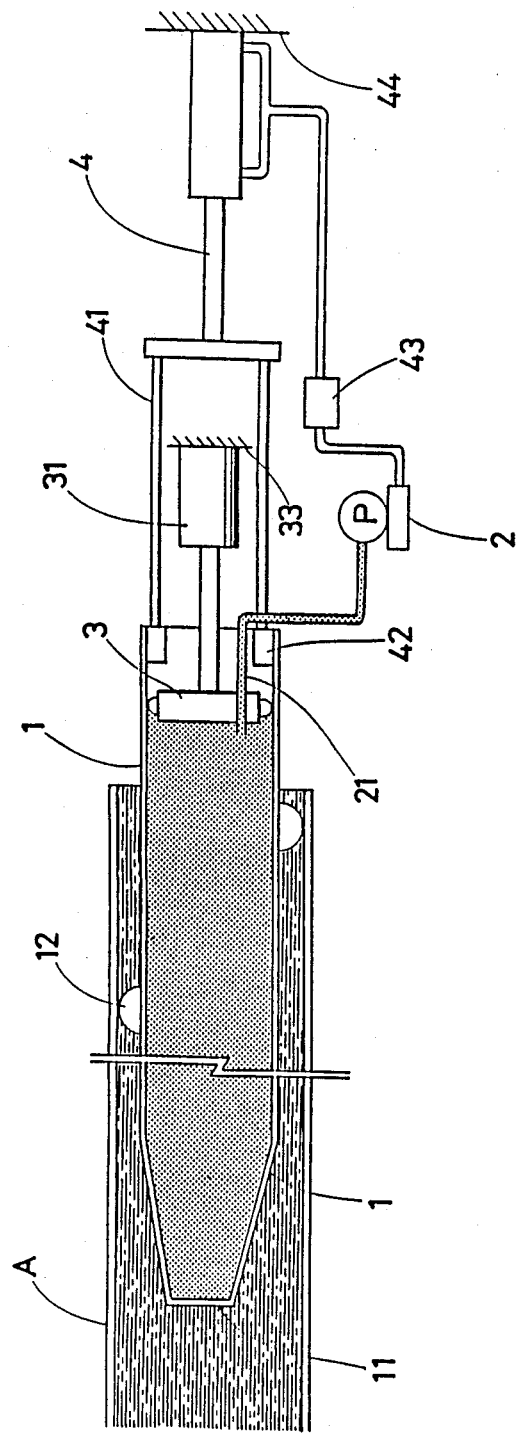
Figures 3A, 3B, 3C, 3D:
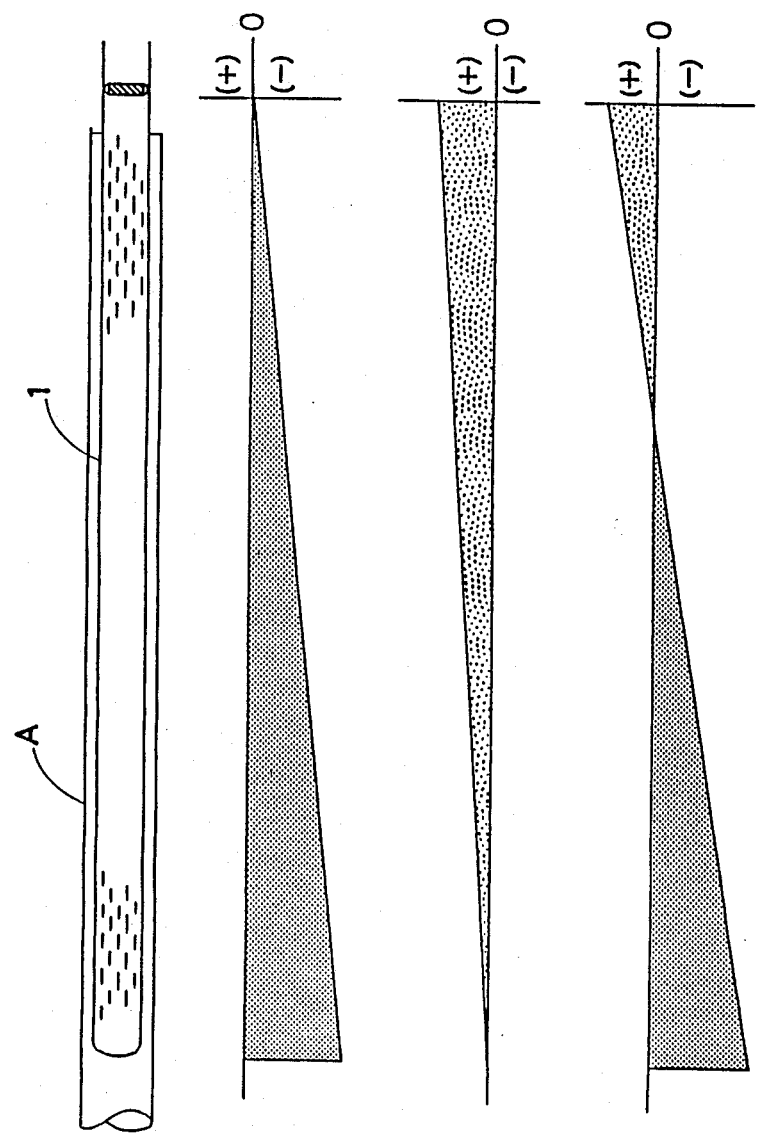

The method and apparatus of the invention will be described in detail below with reference to the accompanying drawings, in which:

FIGS. 1 and 2 are explanatory drawings of an apparatus according to the present invention;

FIG. 3A is a schematic drawing explaining a relation between tensile force and compressive force generated during insertion of a new pipe into an existing pipe in the method according to the present invention. FIG. 3B illustrates tensile stress generated by pressing with fluid compression. FIG. 3C illustrates compressive stress generated by mechanical pressing. And FIG. 3D illustrates a resultant force.

Referring now to the drawings, the invention will be more clearly understood.

First, devices to be used in the present invention will be explained referring to the explanatory illustrations in FIG. 1 and FIG. 2.

Thickness of the material for the pipe to be inserted is preferably as thin as possible so that the pipe 1 flexibly correspond to minor distortion of an existing old pipe A. In the method according to the present invention, the pipe 1 is smoothly driven into the existing pipe A with a tensile stress arising on an overall piping member without receiving an excessive compressive force thereon as described later. Accordingly, thin member can be used for the new pipe without fear of pipe distortion.

The top of the pipe 1 to be inserted is sealed with a cover 11.

Sliding spacers 12 can be optionally placed at intervals on a helical line of the external surface of the pipe 1 so that the pipe 1 may be inserted smoothly into the existing old pipe A.

Another device is to supply a liquid or a gas (hereinafter referred to as a fluid) into the new pipe, the device comprising, for example, a pump 2 outside the pipe 1 and a hose 21 which connects the pump 2 to the new pipe 1. The end of the pipe 1 is plugged with a plug 3, through which said hose 21 penetrates The outer diameter of the plug 3 is about the same as the inner diameter of the pipe 1. The plug 3 is applied with Waterproof sealing material on the periphery so as to form a piston-like structure.

At the opposite end of the plug 3, a reaction force receiving cylinder 31 is placed to receive a force transmitted from the plug 3. This cylinder 31 then transmits the force to a force receiving wall 33 and as a result, the volume increase of the fluid is converted to a force to drive the new pipe 1 into the existing pipe A.

The force receiving cylinder 31 mentioned above now acts as a movable cylinder actuator. When the piston of this cylinder actuator 31 compresses the fluid under the condition wherein a valve of the hose 21 is closed, the new pipe 1 is filled up with the fluid. As a result the new pipe 1 is driven into the existing pipe A.

A device to control abrupt thrusting movement of the new pipe 1 is installed. This device would not be needed if the new pipe 1 could move moderately in proportion to the volume increase of the fluid in the pipe 1 or to the movement of the piston of the cylinder actuator 31 during compression. In fact, a static frictional resistance is much greater than a dynamic frictional resistance. Consequently, the new pipe 1 having been static moves abruptly by releasing accumulated force at a stroke. The plug 3 is simply a piston-like structure and can not control the abrupt movement of the pipe 1 caused by such an excessive force. Accordingly, a braking device 4 is used to suppress such a movement.

This braking device 4 is an ordinary hydraulic cylinder attached to a reaction force receiving wall 42. For example, a hydraulic circuit 43 of this hydraulic cylinder 4 is connected to a circuit controller 43 which regulates a rotation number of a fluid supplying pump 2 so that the pipe 1 moves restrictively in proportion to the volume increase of the fluid supplied.

The connector 41 is made of such a rigid material as steal rod, so that the braking device 4 suppresses the abrupt thrusting movement of the pipe 1 and also gives a compressive force to the pipe 1 in proportion to the volume increase of the fluid in the pipe 1.

The connector 41 and the pipe 1 are connected by using a holding device 42. There may be at least two types of structure for the holding device 42. One is an internal ring chuck which expands to the inner diameter thereof. This chuck is located inside of the rear rim of the pipe 1 and expands to the inner diameter of the ring, thus, the pipe 1 can be tightly held from the inside of the pipe 1 by pressing against the inner wall of the pipe 1.

Another type of the holder 42 is an external ring chuck which holds the pipe 1 from outside of the pipe 1 by narrowing to the outer diameter thereof with compression. This type of the chuck should be placed either the periphery of the pipe 1 where the fluid is filled up, or the rear rim of the pipe 1, where the above-mentioned internal chuck is applied.

The operation of the apparatus comprising the aforementioned devices will be now explained referring the drawings.

The top of the pipe 1 to be newly constructed is inserted into the existing pipe A from one end thereof.

The pipe 1 near the rear rim thereof is sealed with the plug 3 and the fluid is injected into the pipe 1. The pressure of the injection is subsequently transmitted to the overall interior of the pipe 1 according to the Pascal's principle, and the tensile stress is produced on an overall of the member of the pipe 1.

With the operation of the pump 2, the volume of the fluid in the pipe 1 is increased. Subsequently, the pipe 1 moves forward in proportion to the volume of the fluid having being supplied, since the fluid is filled in the pipe 1 and sealed with the plug 3. The plug 3 is capable of sliding and is connected to the cylinder 31 which is fixed on the reaction force receiving wall 33.

The stress acting on the pipe 1 is not compressive stress but tensile stress (FIG. 3B), and the pipe 1 moves as if it were simply pulled from the top thereof like a single long rod owing to the above-mentioned mechanism. Consequently, buckling of the pipe 1 would never occur even if thin members are used for the pipe 1.

The fluid injected into the pipe 1 is now sealed with a valve 3. Subsequently, the piston of the cylinder actuator 31 is pushed to drive the pipe 1 having been swollen due to the fluid filled therein, as if the pipe were one big block.

The aforementioned 2 types of driving, namely, the driving due to the increased volume of the fluid, and the driving due to compressing the sealed fluid, can be alternatively or simultaneously operated.

Due to the friction resistance between the new pipe 1 and the existing pipe A, the pipe 1 does not instantaneously start moving forward with the increase of the fluid volume in the pipe 1.

However, once a force excessive to the friction resistance is generated, the pipe 1 drives abruptly. At this moment, the braking device 4 works.

The braking device 4 moves in proportion to the volume increase of the fluid in the pipe 1, so that the device acts as an resistance against the excessive movement of the pipe 1 and regulates the progressive movement of the pipe 1.

The braking device 4 also works as a resistance when an existing pipe A is located on a slope where the pipe 1 is apt to slip down by itself.

Further, the braking device 4 works as a resistance to suppress the elastic shrinkage of the pipe 1 due to release of tension stress of the pipe 1 when the fluid in the pipe 1 is removed.

The pipe 1 can be driven also by compressing the pipe 1 through a connector 41 which is made of a rigid material and makes a connection between the rear rim of the pipe 1 and the braking device 4. This time, the cylinder of the braking device 41 works as a jack and is extended so that the compressive force can be transferred to the new pipe 1 through the holding device 42 and drives the pipe 1. Further, the compressive stress generated by this force axially acting on the pipe (FIG. 3C) is added to the tensile stress generated on the pipe 1 by increasing the volume of the fluid in the pipe 1 and/or by compressing the fluid (FIG. 3B), which results in compound force as illustrated in FIG. 3D, so that the tearing of the pipe 1 can be prevented. Thus, the apparatus according to the present invention makes it possible to extend the distance of insertion at a time without destruction of the pipe 1.

Since the length of the pipe 1 to be inserted in one operation is limited, the extension process follows. After inserting the pipe 1, all the devices are detached and then another new pipe is connected to the above new pipe by welding. By repeating this operation, all the pipes are completed into one pipeline.

It is also possible to fill with a fluid of high density in the space between an existing pipe A and a new pipe 1, so that buoyant force is generated and lifts the new pipe 1. Thus, the friction resistance between the two pipes can be reduced.

The sliding spacers 12 located on the periphery of the new pipe 1 on a helical line also reduce the friction resistance. For the sliding spacers 12, material with a small enough coefficient of friction should be chosen to reduce the friction resistance.

In order to prevent pipes from rusting, a rust preventive is applied into the space between the existing pipe A and the new pipe 1.

This invention is intended to work as described in the above explanations. The following results may be anticipated:

(1) The system according to the present invention is constructed to drive a new pipe by increasing the volume of a fluid supplied in the new pipe and/or compressing a fluid filled and sealed in the pipe from rear end, so that insertion and driving of the new pipe of long distance into an existing pipe can be conducted without compressive destruction of a pipe made of thin member.

(2) A control device is constructed to drive a new pipe gradually and restrictively in proportion to the volume increase of the fluid supplied into the new pipe. Consequently, excessive driving of the new pipe is suppressed and therefore, the operation is stable and safe.

(3) In case that the tensile stress on a new pipe becomes excessive, compressive force is loaded to the pipe from the rear rim, cancels the tensile stress, and so distance of insertion can be extended without destroying the pipe.

(4) In order to hold a new pipe with a thin member without destruction, a ring chuck is constructed either inside or outside of the pipe, so that the thin new pipe can be securely held.

(5) With a fluid of high density supplied in a space between an existing pipe and a new pipe, a buoyant force is generated and facilitates the insertion of the new pipe.

I claim:

1. A method for driving a new pipe sealed with a cover on the head into an existing pipe by injecting a fluid in said new pipe, the method comprising:
    (a) driving the new pipe by increasing the volume of the fluid in the said new pipe,
    (b) driving the new pipe by compressing the fluid filled and sealed in the said new pipe,
    (c) driving the new pipe by pushing the pipe axially with an aid of a holder at the rear rim of said pipe, and
    (d) regulating the movements of the new pipe by controlling the driving forces generated by (1) increasing volume of the fluid in said pipe and/or (2) compressing the fluid filled and sealed in said pipe and (3) pushing the pipe axially with an aid of a holder at the rear rim of said pipe.

2. An apparatus for refurbishing an existing pipe, which comprises
    (a) a new pipe which is sealed with a cover on the head thereof and is to be inserted into the existing pipe,
    (b) a device to supply a fluid into said new pipe,
    (c) a plug to seal the supplied fluid into the new pipe,
    (d) a device to transmit an axial force with an aid of a holder at the rear rim of the new pipe together with a connector, and
    (e) a circuit to synchronously regulate the movements generated by (1) increasing volume of the fluid in said pipe and/or (2) compressing the fluid filled sealed in said pipe and (3) pushing the pipe axially with an aid of a holder at the rear rim of said pipe.

3. A method as set forth in claim 1, wherein a fluid with a high density is applied in the space between the existing pipe and the new pipe.

4. An apparatus as set forth in claim 2, wherein said holder to hold the new pipe at the rear rim is a ring chuck pressed against an internal wall of the new pipe.

5. An apparatus as set forth in claim 2, wherein said holder to hold the pipe near the rear rim is a chuck ring pressed against an external wall of the new pipe where the fluid is filled up.

6. An apparatus as set forth in claim 2, wherein said connector is made of a rigid material.

7. An apparatus as set forth in claim 2, wherein a device to supply a fluid into the new pipe is furnished with a hose which penetrates said plug installed at rear rim of the new pipe.

8. An apparatus as set forth in claim 2, wherein sliding spacers are placed on the periphery of the new pipe.

* * * * *